(No Model.) 2 Sheets—Sheet 1.
P. SINNOTT.
POTATO DIGGER.
No. 329,780. Patented Nov. 3, 1885.
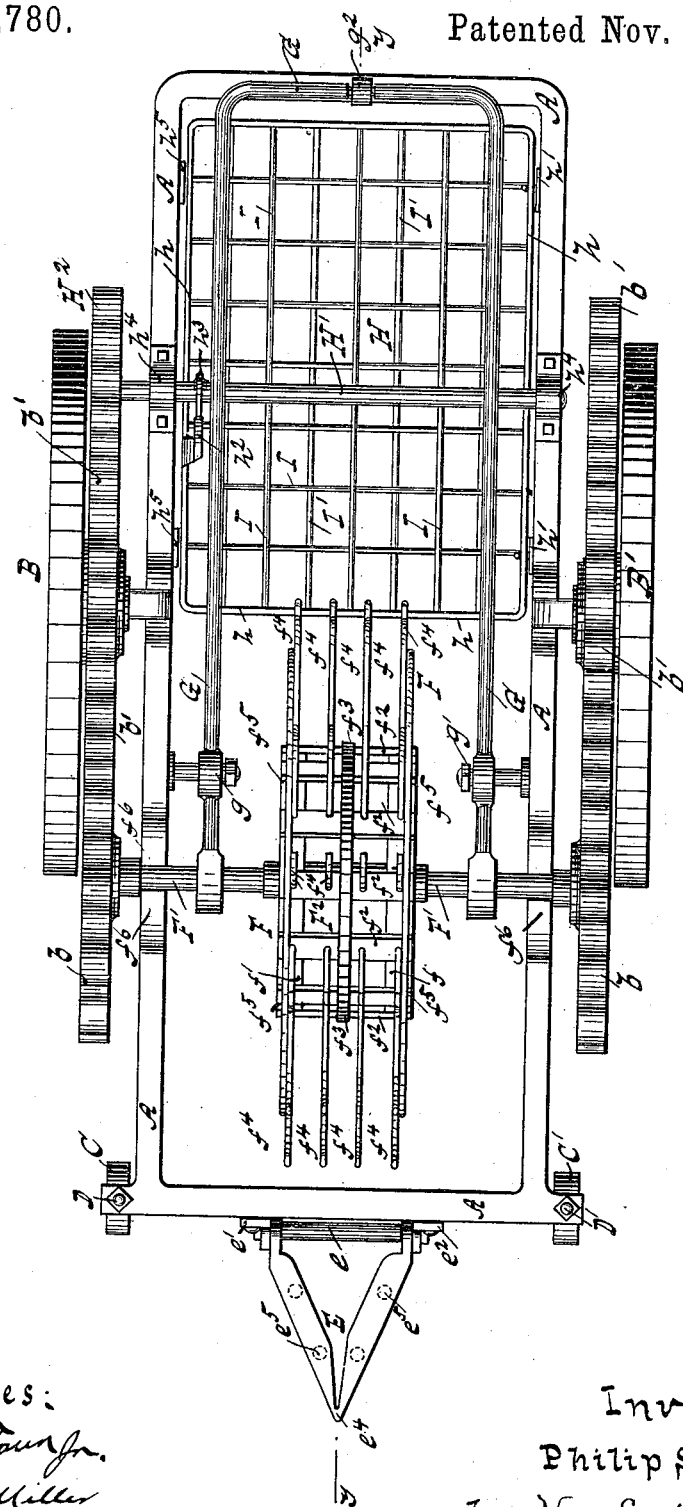
Witnesses:
Arthur du Faur Jr.
William Miller
Inventor:
Philip Sinnott
by Van Santvoord & Hauff
his Attorneys.

(No Model.) 2 Sheets—Sheet 2.
P. SINNOTT.
POTATO DIGGER.
No. 329,780. Patented Nov. 3, 1885.
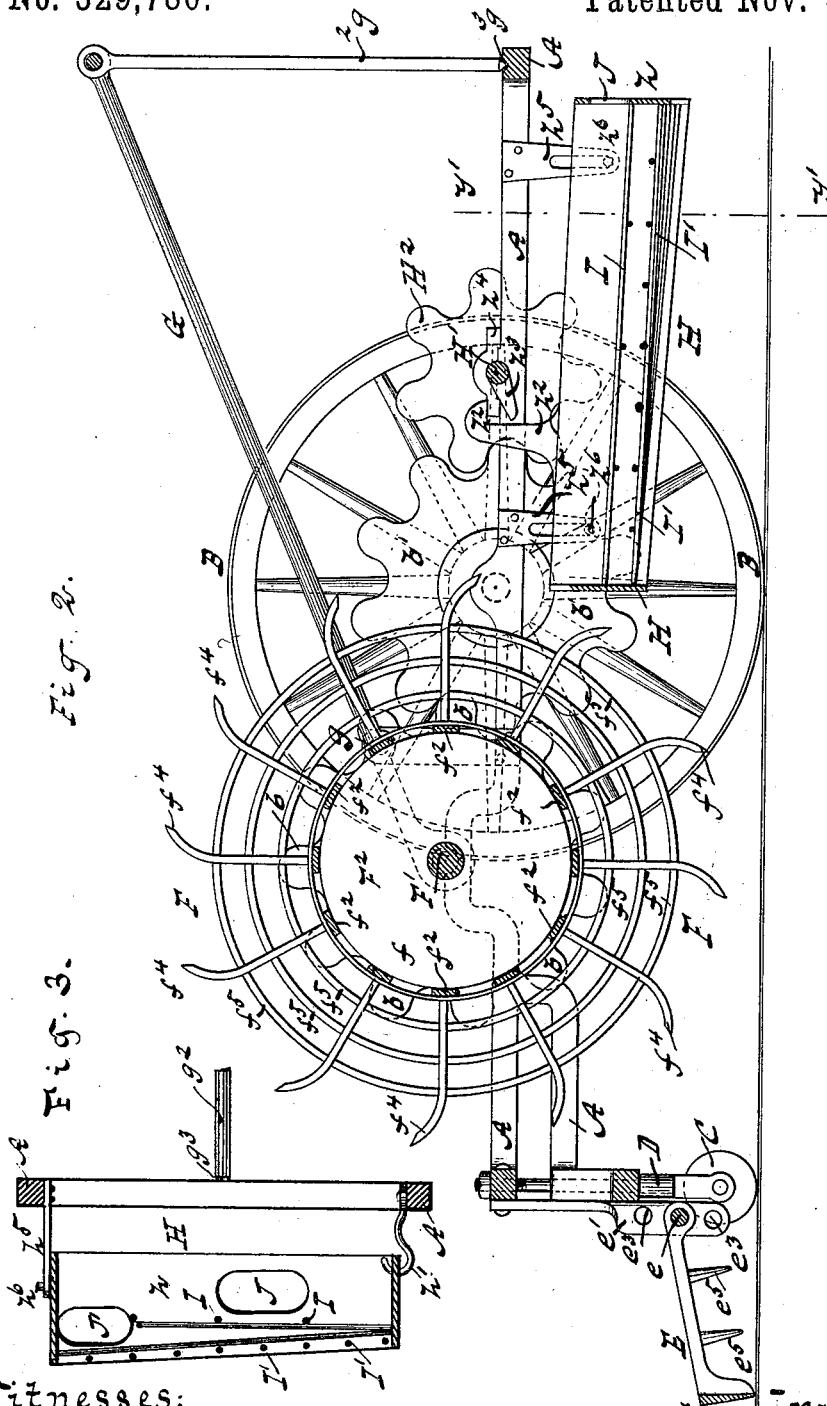
Witnesses:
A Faber du Faur Jr
William Miller
Inventor:
Philip Sinnott
By Van Santvoord & Hauff
his Attorneys.

UNITED STATES PATENT OFFICE.

PHILIP SINNOTT, OF NEW YORK, N. Y.

POTATO-DIGGER.

SPECIFICATION forming part of Letters Patent No. 329,780, dated November 3, 1885.

Application filed July 23, 1885. Serial No. 172,451. (No model.)

*To all whom it may concern:*

Be it known that I, PHILIP SINNOTT, a citizen of the United States, residing at New York, in the county and State of New York, have invented new and useful Improvements in Potato-Diggers, of which the following is a specification.

My invention relates to improvements in that class of agricultural implements known as "potato-diggers;" and it consists in the combination of devices hereinafter described and claimed, reference being made to the accompanying drawings, illustrating my invention, in which—

Figure 1 is a plan or top view of a potato-digger embodying my invention. Fig. 2 is a longitudinal vertical section of the same in the plane $y\ y$, Fig. 1. Fig. 3 is a transverse vertical section thereof in the plane $y'\ y'$, Fig. 2.

Similar letters indicate corresponding parts.

In the drawings, the letter A designates the frame of the potato-digger, which frame rests upon suitable wheels, B B', which can be journaled to the said frame and upon smaller wheels C C', which can have bearings in posts D D', Fig. 2, extending downward from the forward end of the frame; but the latter wheels may be omitted without affecting the operation of the digger. E is the vine-clearing share, which also serves to loosen or rake up the earth. It is secured either firmly to the front end of the frame A, or, as in the example shown in the drawings, the same can be hinged by means of a hinging bar, $e$, to hangers $e'\ e^2$, secured to the front of the frame, and which can be provided with several holes, $e^3$, Fig. 2, arranged in a vertical series. These holes, which are adapted to support the hinging bar $e$, permit the rear end of the clearing-share E to be adjusted above the ground to varying heights for an obvious purpose. The clearing-share may be of any well-known construction; but in the example shown in the drawings I have provided the potato-digger with a share having a suitable nose, $e^4$, and downwardly-projecting prong $e^5$, the construction of the same being similar to that of an ordinary harrow. Mounted upon a suitable shaft, F', is a digger-wheel, F, consisting of a drum, $F^2$, which is constructed in the example shown in the drawings with two heads, $f\ f'$, the circumferential edges of which are connected by cross-pieces $f^2$, placed at proper distances apart, giving to the drum a sieve-like character in order that the dirt clods which are accumulated by the wheel may fall through the apertures formed by the said cross-pieces $f^2$ and be disintegrated or broken in the said fall, the apertures being made small enough to prevent the potatoes from passing through with the earth. To strengthen this drum and also to decrease the transverse dimension of the apertures, one or more bands, $f^3$, may be secured around the girth of the drum between the heads.

To the cross-pieces $f^2$ are attached radial arms $f^4$, which are intended to gather the potatoes and earth after the potato hills or rows have been properly loosened or broken by the action of the digger-share E, the said arms being suitably curved in the proper direction for the said purpose. In the example shown in the drawings four series of such arms are distributed on the face of the drum $F^2$; but the number of the said series must be varied with the width of the said drum in order that the distance between the arms may be the correct one to insure the proper action of the implement.

In order to prevent the mixed potatoes and earth from falling laterally from the digger-wheel, I secure to the two outer series of arms $f$ a series of concentric rings, $f^5$, thus forming secondary sieves, through which the dirt also sifts during the action of the digger, while the potatoes are retained in the cage thus formed until properly delivered from the same. A rotary motion is imparted to the shaft F', upon which is mounted and secured the digger-wheel F, by means of suitable connections with the wheels B B', which will effect that purpose—for instance, as shown in the drawings—by gear-wheels $b\ b'$, the gear-wheels $b$ being mounted on the ends of the shaft F' and being engaged by the gear-wheels $b'$, secured to the hub of the wheels B B'. Instead, however, of employing gears mounted upon the opposite ends of the shaft F', and upon the hubs of the wheels, one pair of gear-wheels, one of which is on one end of the shaft F' and the other on the hub of one of the wheels, can be used to effect the rotation of the digger-wheel F; but I prefer for obvious reasons to use two sets of gears, $b\ b'$. Suitable pulleys and a connecting-band or bands might be used instead of the gear-wheels to rotate the digger.

In order to render it possible to throw the digger F out of contact with the ground, and also to thereby stop its rotation on turning corners or for other purposes, I provide the shaft with open bearings $f^6$, Fig. 1, in the frame A, so that the shaft, together with the digger-wheel F thereon, may be lifted upward, whereby the gears $b\ b'$ will also be thrown out of contact with each other. To accomplish this raising of the shaft F', any of the variety of well-known means can be employed; but I prefer to use some such mechanism as is illustrated in the drawings, which consists, essentially, of a yoked or U-shaped lever, G, the arms of which are provided with suitable eyes to grasp the shaft F' at suitable points—as, for instance, on both sides of the digger-wheel F—and the said lever can be fulcrumed at $g\ g'$ to suitable bolts or the like, so that by bearing down upon the rear end of the said lever the digger-wheel can be raised to any necessary height, while the eyes allow the rotation of the shaft when the same is in its proper position. The lever is secured, as illustrated, in a position corresponding to the one necessary to keep the shaft F' down upon its bearings by a supporting-bar, $g^2$, one end of which is pivoted to the lever, while its free end is adapted to fit into a socket, $g^3$, in the frame. However, other suitable means can be employed to removably retain the lever in the required position. The potatoes and earth collected by the digger-wheel F are rotated therewith and delivered to a sieve, H, situated behind the said digger-wheel F and in a proper position to receive the contents of the wheel. This sieve H can be rigidly connected to the back portion of the frame A and be entirely open at its rear end to allow the potatoes to fall out after passing the length of the sieve, the sifting being effected by the jolting of the frame caused by the unevenness of the ground; but in the drawings I have illustrated a peculiar form of sieve by means of which the potatoes are neatly separated from the accumulation of earth, &c. This sieve H consists of a box, $h$, Figs. 2 and 3, which extends across the rear part of the frame and is open at the top and bottom. This box is hinged at one of the longitudinal sides to the frame by hooks $h'$, secured to the frame, or by other common means usually employed for hinging, while at its other side it is provided with an upwardly-projecting hook, $h^2$, which is adapted to be intermittently engaged by a cam, $h^3$, on a shaft, H', which shaft H' can be supported on the frame of the digger and can have suitable bearings, $h^4$, therein. A rotating motion can be imparted to this shaft by means of a gear-wheel, $H^2$, secured to one end of the same, which gear-wheel is engaged by one of the gear-wheels, $b'$, on the wheels B B', whereby the cam $h^3$ on the shaft H' is caused to engage with the hook $h^2$, and thereby raise the sieve H until the said cam passes out of the arc of contact, whence it will release the said hook and the sieve will fall from its own weight. By this means a continuous vibratory motion of the sieve is obtained while the implement is in use, thus insuring a successful operation of the implement.

Instead of the cam $h^3$ on the shaft, the said shaft may be provided with a U-shaped portion or crank, which will engage with the hook as before. To stop the sieve in its downward course, slotted hangers $h^5$, which are secured to and project from the frame, can be employed, the slots of which are engaged by suitable projections, $h^6$, on the corresponding side of the sieve H; but an ordinary stop or bent bar, the bent portion of which extends under the sieve, can be used to effect the same purpose; but it is evident that the slotted hangers $h^5$ also serve to guide the sieve and prevent the same from turning or twisting. This sieve can be provided with one screen constructed of interlacing bars or wires in the ordinary manner, or I can provide the sieve H with several such screens, for example, as follows: A top screen, I, Figs. 2 and 3, extends completely across the box $h$, the said screen being composed of longitudinal and transverse bars secured to the said box, the apertures thus formed being sufficiently large to allow the earth and the smaller potatoes to pass downward through the said apertures, while the larger potatoes are retained and discharged through a hole or opening, J, in the rear end of the sieve and in the proper level; or, if desired, several such holes or openings may be distributed on the said rear end to effect the discharge of the larger potatoes. The smaller potatoes and earth, after passing through the meshes of the screen I, fall upon a second screen, I', situated below the said screen I, and which screen I' is composed of similar longitudinal and transverse bars; but the meshes thereof are closer than those of the first sieve, I, so that the smaller potatoes are retained upon this screen I', while the earth is sifted out due to the vibratory motion of the sieve. In the example shown in the drawings this lower screen, I', makes an angle with the horizontal plane in both directions—that is to say, it slopes both downward longitudinally toward its rear end and also transversely toward the actuated side of the sieve—so that all the matter deposited upon this screen is fed toward one corner of the same, and the potatoes remaining on this screen fall through a corresponding discharge-opening, J', formed in the said corner in the proper level while the earth falls through the screen. The upper screen, I, is best arranged to fall in a horizontal plane transversely, while longitudinally the same slopes downward toward the rear end of the sieve; but, if desired, it can form an angle in both directions with the horizontal plane.

In the example shown in the drawings the screens I I' form right angles with the transverse sides of the sieve, and in order that the contents of the same, delivered thereto by the digger-wheel F, will gradually work their way toward the rear of the sieve and be discharged through the orifices J J', the sieve is hung obliquely; but, if desired, screens can be placed at an angle in the box of the sieve, and the sieve suspended in a horizontal plane.

Any ordinary draft device can be attached to the forward end of the frame of the digger.

What I claim as new, and desire to secure by Letters Patent, is—

1. The combination, in a potato-digger, of the main frame, the vine-clearing share E, connected with the main frame by a vertically-adjustable hinging bar, $e$, a revolving digger-wheel, F, in rear of said share, composed of gathering-fingers and an open drum for receiving dirt clods therein, and a vibrating screen or sieve, H, behind the digging-wheel, substantially as described.

2. The combination, in a potato-digger, of the main frame, the hangers $e'\ e^2$, connected with the front end of the frame and having a series of holes, $e^3$, a hinging bar, $e$, vertically adjustable by the said holes, and the vine-clearing share E, hung on said bar, with a revolving digger-wheel, F, and a screen or sieve, H, behind said wheel, substantially as described.

3. The combination, in a potato-digger, of the main frame, the hangers $e'\ e^2$, secured to the front end thereof and having a series of holes, $e^3$, of hinging bar $e$, vertically adjustable by said holes, and a vine-clearing share, E, hung on said bar, with a digger-wheel, F, comprising the end heads, $f f'$, the separated cross-pieces $f^2$, and the gathering-fingers $f^4$, rigidly secured to the cross-pieces, and a vibrating screen or sieve behind the digger-wheel, substantially as described.

4. The combination, in a potato-digger, of the main frame, the front pivoted share, E, and the revolving digger-wheel F, with the front and rear slotted hangers, $h^5$, the sieve H, suspended by hooks and having pins engaging the hangers and provided with the upwardly-projecting hook $h^2$, adapted to be operated for vibrating the screen, substantially as described.

5. The combination, with the main frame and the screen or sieve, of the revolving digger-wheel F, comprising the heads $f f'$, the separated cross-pieces $f^2$, the gathering-fingers $f^4$, secured to said cross-pieces, and the concentric rings $f^5$, secured to the outermost gathering-fingers, substantially as described.

6. The combination of the main frame and the revolving digger-wheel F, having gathering-arms $f^4$, with the vibrating screen H, having the upper screen, I, sloping toward the rear, and the lower screen, I', sloping rearward and transversely, and discharge openings J J, substantially as described.

7. The combination of the main frame and the revolving digger-wheel F, having gathering-arms $f^4$, with the screen H, having the rigidly-attached hook $h^2$, the shaft H', having the cam $h^3$, and the wheel $H^2$, on said shaft rotated from the ground-wheels, substantially as described.

8. The hinged sieve H, the hook $h^2$ thereof, the rotary shaft H', the cam $h^3$ thereof adapted to engage the hook, the slotted hangers $h^5$, and the projections $h^6$ on the sieve engaging the slots in the hangers, substantially as shown and described.

9. The combination of the main frame and the screen or sieve H with the digger-wheel having gathering-arms $f^4$, and a series of separated rings, $f^5$, secured to each outermost set of gathering-fingers, substantially as described.

10. The combination, with the frame A and the wheels B B', of the digger-share E, the digger-wheel F, sieve H, having screens I I' and orifices J J', gear wheel $b\ b'$, lever G, shaft H', and cam $h^3$, adapted to engage a hook or projection, $h^2$, substantially as shown and described.

In testimony whereof I have hereunto set my hand in the presence of two subscribing witnesses.

PHILIP SINNOTT.

Witnesses:
 E. F. KASTENHUBER,
 A. FABER DU FAUR, Jr.